April 28, 1931. J. V. ROWLEY 1,802,836

MEANS FOR EXTRACTING MINERALS FROM STREAM BEDS

Filed Sept. 4, 1928

INVENTOR.
JOHN V. ROWLEY
BY Munn & Co.
ATTORNEYS.

Patented Apr. 28, 1931

1,802,836

UNITED STATES PATENT OFFICE

JOHN V. ROWLEY, OF FORTUNA, CALIFORNIA

MEANS FOR EXTRACTING MINERALS FROM STREAM BEDS

Application filed September 4, 1928. Serial No. 303,902.

My invention relates to improvements in means for extracting minerals from stream beds, and it consists in the combination, construction and arrangement hereinafter described and claimed and in the steps hereinafter set forth.

The object of the process is to separate the fine gravel, sand and so-called "pay dirt" contained therein from the bed of a stream while the same is at freshet or flood stage. I accomplish this by means of screened conduits which are placed in the stream and inclined at an angle for catching this small material and for conveying it away from the stream to a suitable plant where the values may be extracted.

If the topography permits, this may be accomplished by gravity flow—that is, the conduits are inclined at an angle for causing the material caught to flow therethrough. In case this cannot be done, a pumping plant, or other means for hastening the discharge through the outlet, may be resorted to.

Other objects and advantages will appear in the following specification, and the novel features of the device will be particularly pointed out in the appended claims.

My invention is illustrated in the accompanying drawings forming a part of this application, in which Figure 1 is a top plan view of the device shown applied in a stream bed;

In the installation of a means of this character, the plant must necessarily meet the local conditions. The preferred method is to construct the conduits by excavating through bedrock and during the period of low water. The device will then be ready for high water and will function to carry off the fine materials, these materials carrying the precious metals.

In order to meet the great variety of conditions in placer mining, a wide variation in types of construction of conduits must be provided. Of course, the widths of the conduits, the material from which they are constructed, the angle at which they extend in respect to the stream bed must also be designed to fit the particular case.

Figure 1:
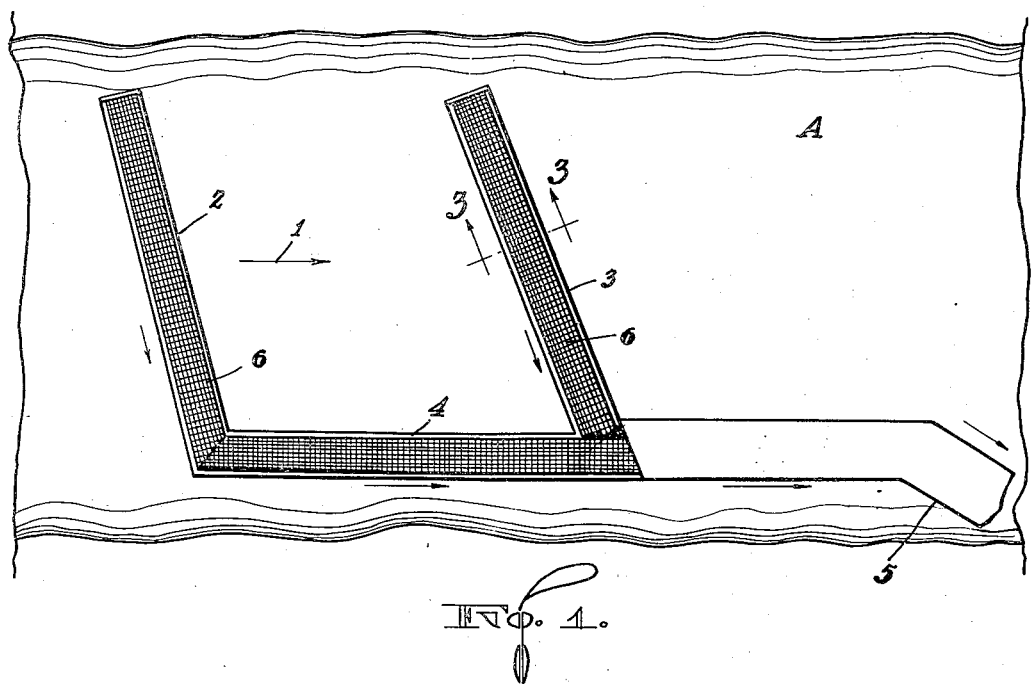
Figure 2:
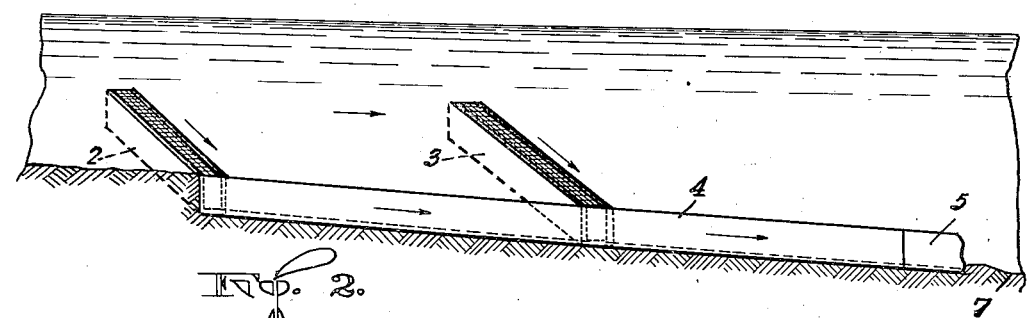
Figure 2 is a side elevation of the device.

Referring to the drawings, I have shown a stream bed indicated generally at A, and have shown an arrow 1 for indicating the flow of water in this bed. I lay conduits 2 and 3 across the bottom of the stream bed and incline these conduits with respect to the direction of the flow of the water as clearly shown in Figure 1. Figure 2 further shows how these conduits 2 and 3 are inclined downwardly from the horizontal so as to convey the material received therein toward a common conduit 4 that may parallel the stream for a short distance if desired. The conduit 4 is diverted as at 5 into a closed conduit to clear the stream, and it may lead to any mineral extracting plant not shown. Figure 2 shows how the conduit 4 is inclined downwardly at a slight angle from the horizontal.

Figure 3:
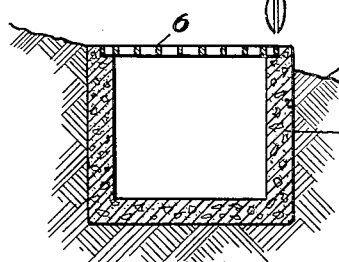
Figure 3 is a section along the line 3—3 of Figure 1.

In Figure 3 I show that the conduit 3, for example, is made from concrete. It is obvious that the conduit may be constructed from a different material, if desired, without departing from the spirit and scope of my invention. Across the open top of the conduit, I dispose a screen 6 that may be of any mesh desired.

The screen permits only fine material to enter the conduit. The conduit 4 is screened in the same manner.

If desired, the conduit may be partially or entirely embedded in bedrock indicated generally at 7.

Figure 4:
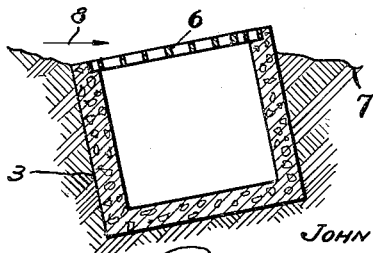
Figure 4 is a similar section but showing the conduit tilted slightly along its longitudinal axis.

In Figure 4 I show the same conduit 3 as being tilted at an angle so that the screen 6 is disposed out of the horizontal. The direction of water flow is indicated by the arrow 8 in Figure 4, and the fine material will be caught in the conduit in much the same manner as shown in Figure 3. The conduit shown in Figure 4 is a little more positive in its action.

As already stated, the fine material caught by the conduits 2 and 3 is conveyed to the conduit 4, and the latter carries it to any desired point where the extracting process is carried out.

Although I have shown and described one embodiment of my invention, it is to be understood that the same is susceptible of various changes, and I reserve the right to employ such changes as may come within the scope of the appended claims.

I claim:

1. A device for removing fine particles of ore from a stream and comprising a plurality of opened top conduits extending transversely of the stream and having their uppermost edges substantially disposed on the level of the stream bed, whereby the particles will gravitate into the conduits and the débris of the stream will pass thereover, screens arranged over the conduits for permitting particles of a certain size to be received therein, and a common conduit communicating with the first-named conduits for conveying the particles from the stream.

2. A device for removing fine particles of ore from a stream and comprising an opened top conduit extending transversely of the stream and having its uppermost edge substantially disposed on the level of the stream bed, whereby the particles will gravitate into the conduits and the débris of the stream will pass thereover, a perforated member disposed over the conduit for permitting the particles of a certain size to be received therein, said conduit having a portion extending down stream, deflected laterally and out of the stream.

JOHN V. ROWLEY.